July 29, 1969 F. J. SORDELLO 3,458,785

FINE AND COARSE MOTOR POSITIONING CONTROL FOR A MAGNETIC DISC MEMORY

Filed Sept. 7, 1966 5 Sheets-Sheet 1

INVENTOR
FRANK J. SORDELLO

By Vernal W. Cleary

ATTORNEY

United States Patent Office 3,458,785
Patented July 29, 1969

3,458,785

FINE AND COARSE MOTOR POSITIONING CONTROL FOR A MAGNETIC DISC MEMORY

Frank J. Sordello, San Jose, Calif., assignor to International Business Machines Corporation, Armonk, N.Y., a corporation of New York Filed Sept. 7, 1966, Ser. No. 577,746
Int. Cl. H02p *1/54, 5/46, 7/48*
U.S. Cl. 318—18 6 Claims

ABSTRACT OF THE DISCLOSURE

A closed loop servosystem serves to fine position a signal sensing transducer relative to the center of a data track of a rotary recording member. Pairs of servo tracks having sinusoidal waveforms are recorded on either side of each data track and equidistant therefrom, but have signal portions 180° out of phase, so that a double sideband suppressed carrier, amplitude-modulated signal is generated. A second signal having the same frequency, but 90° out of phase as the carrier is generated. These signals are added, and the resultant signal provides position and velocity information to enable coarse and fine positioning of the transducer over a selected data track and damping of the servosystem.

This invention relates to memory systems and more specifically to means for positioning a pickup transducer over a selected or desired processor-data information memory track.

In copending patent application Ser. No. 531,135 filed Mar. 2, 1966, in the name of Robert J. Black and Frank J. Sordello entitled, "Memory System," there is disclosed a positioning servo for a pickup head of a memory element which utilizes servo tracks on the memory element to position the pickup head with respect to or over a processor-data information track. In the present invention, similar servo tracks are utilized to position the pickup head over a data information track with the servo tracks being utilized to provide velocity information as well as position information for the servo to position the pickup head.

An object of the invention is to provide a new and improved sensing means for detecting the relative position of two members.

Another object of the invention is the provision of a sensing circuit for the pickup head of a memory to accurately determine the position of the pickup with respect to a processor-data information track.

Still another object of the invention is to provide a fine positioning servo for a pickup head for a memory unit which provides fine position information as well as fine velocity information to position the pickup head with respect to the memory track.

These and other objects are realized in the present invention by utilizing servo tracks to effect generation of a double side band suppressed carrier amplitude modulated signal in response to relative displacement between two members. The double side band suppressed carrier signal is modulated as a function of the relative position of the two members. A second signal is generated which has the same frequency as the suppressed carrier and is 90 degrees out of phase therewith. The double side band suppressed carrier and the second signal are added to produce a resultant signal which contains position information and additionally velocity information. The velocity information can then be utilized as a damping quantity in a servo loop in positioning the two members.

The above objects, features and advantages of the present invention will be apparent from the following description taken in conjunction with the accompanying drawings wherein.

GENERAL DESCRIPTION

Figure 1:
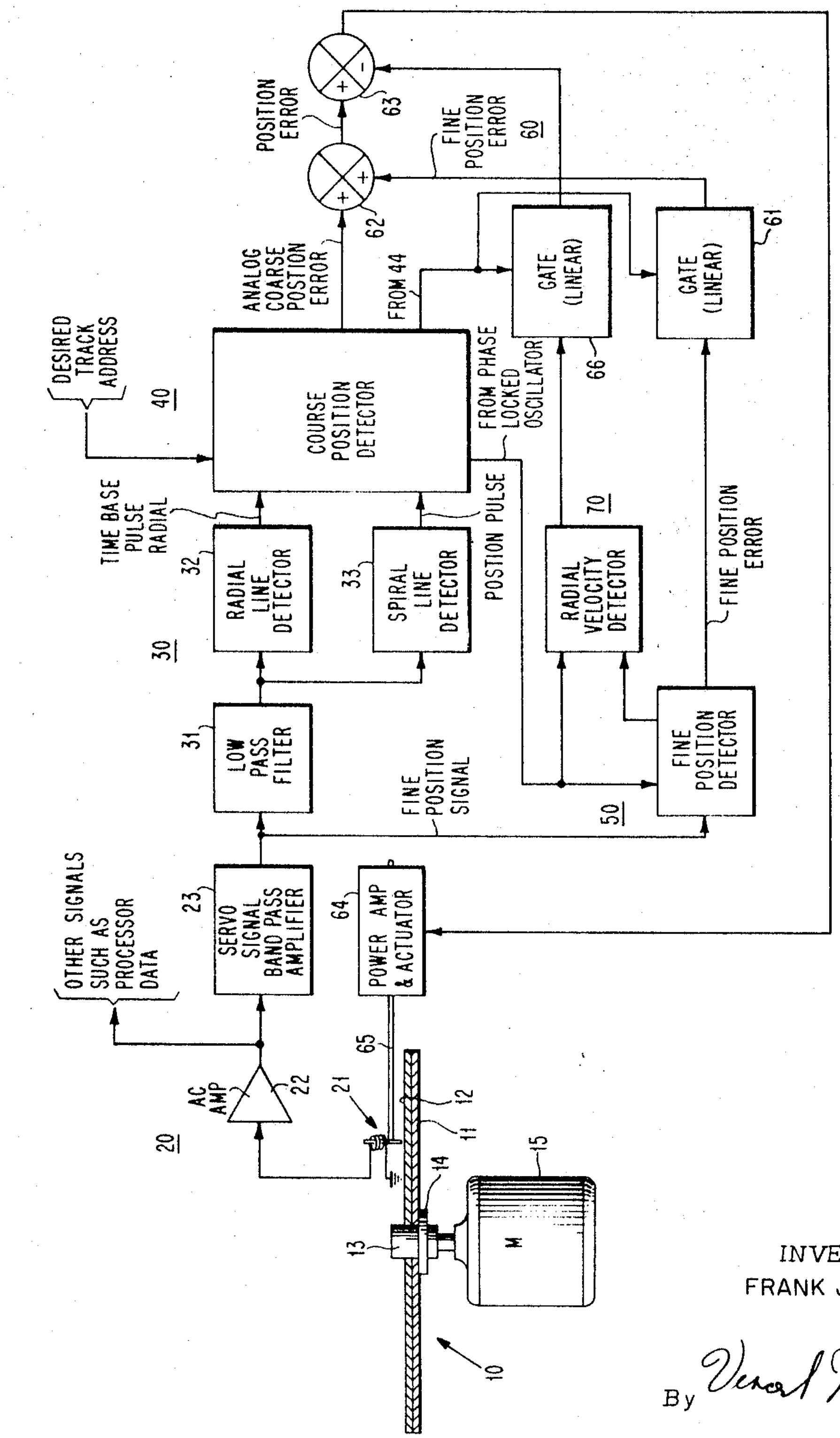
FIGURE 1 is a schematic diagram in block form of a preferred embodiment of the invention.

In the embodiment of the invention illustrated in FIG. 1, a channel is illustrated for providing a coarse positioning of the pickup head with respect to the recording disk. This particular channel and coarse positioning means is shown merely by way of example to illustrate how the fine positioning system as well as the velocity detector, which form a part of the present invention, can be utilized with a coarse positioning detector and servo system.

More specifically, and by way of example only, the embodiment in FIGURE 1, illustrates such a coarse positioning channel and fine positioning channel which position a magnetic pickup 21 with respect to a magnetic disk 10. The magnetic memory disk 10 has alternately recorded thereon servo position information tracks ST1, ST2, etc., and processor-data information tracks DT1, DT2, etc., shown in FIGURE 3. Each of the servo position information tracks has timing signals that define a position time period of different duration than any position timing period defined by similar timing pulses on the other servo postion information tracks. This timing period is used only for and detected by a coarse position detector 40 to provide, through a closed loop servo a coarse position error signal to an actuator means 64 to give the pickup 21 a coarse placement with respect to the desired data track. In addition to this coarse information, each servo track includes a portion that is a continuous sine wave (except for coarse position information phase shifts) portion that is 180 degrees out of phase with the two servo position information tracks adjacent thereto. After the coarse positioning of the pickup, with respect to the desired processor-data information track, the two adjacent sine wave portions of the adjacent servo position information tracks are compared within the pickup 21 so as to generate a signal continuously that will provide continuous fine servoing of the pickup with respect to the desired data track. The adjacent servo tracks are the same frequency and recorded 180 degrees out of phase so pickup 21 provides a single output therefrom that is utilized to provide a position error signal of the pickup with respect to the desired processor-data information track. This signal is a double side band suppressed carrier amplitude modulated signal (except for the coarse pattern's pulses) and is linearly summed with a signal with the same frequency as and 90 degrees out of phase with the carrier (suppressed) to produce a resultant signal. The phase of this resultant signal is a measure of the position of the pickup 21. The phase and hence position information is determined by a fine position (phase) detector 50. The radial velocity detector 70 provides a signal which varies as the frequency of this resultant signal which is a measure of the velocity of the pickup 21. The output of detector 70 therefore can be used to damp a positioning servo that utilizes the position signal from detector 50.

DETAILED DESCRIPTION

Figure 3:
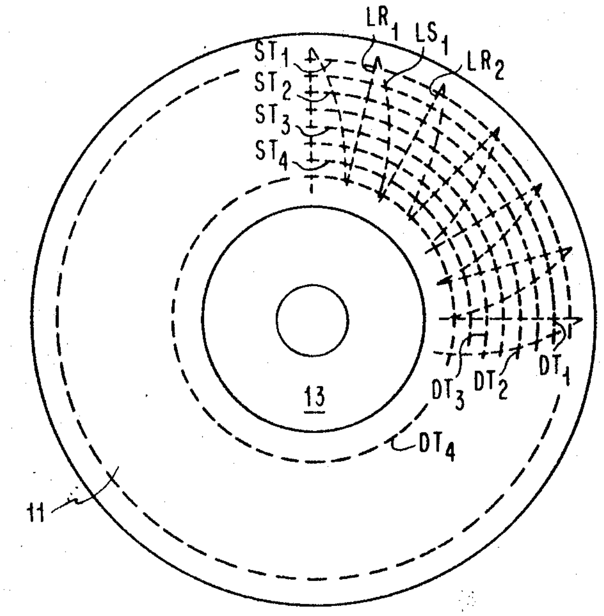
FIGURE 3 illustrates a plan view of the recording disk utilized in the embodiment of the invention illustrated in FIG. 1.

The embodiment of the invention illustrated in the drawing as shown in FIGURE 1 is a closed servo loop for positioning a pickup 21 with respect to a dual coercivity-layered disk 10. The magnetic memory disk 10 includes a high coercivity lower layer 11 and a lower coercivity upper layer 12 with the lower layer 11 having servo position information tracks magnetically recorded therein and the upper section 12 having the processor-data information tracks magnetically recorded therein. A suitable material for disk 10 is shown in U.S. Patent 3,219,353 issued Nov. 23, 1965 entitled "Magnetic Recording Medium." The disk 10 is positioned on a shaft 13 and supported by a flange 14 on the shaft 13 that is driven by a drive motor 15 at a predetermined speed so as to enable reading out of the tracks on the disk 10. FIGURE 3 illustrates a plan view of the disk 10 showing the servo position information tracks and the processor-data information tracks with the servo position information tracks being recorded in the higher coercivity section 11 and the processor data information tracks in the upper layer 12. The processor-data information tracks are illustrated in FIGURE 3 as DT1, DT2, DT3 and DT4. These tracks are equally spaced in the disk layer 12. Located between and an equal distance from the processor-data information tracks, are servo position information tracks ST1, ST2, ST3 and ST4, which are recorded in the higher coercivity layer 11 of disk 10. Thus, ST1 and ST2 are located an equal distance from and on opposite sides of the processor-data information track DT1 whereas servo position information track ST2 and servo position information track ST3 are located an equal distance from the processor-data information track DT2 and likewise servo position information tracks ST3 and ST4 are located an equal distance from processor-data information track DT3.

Figure 4:
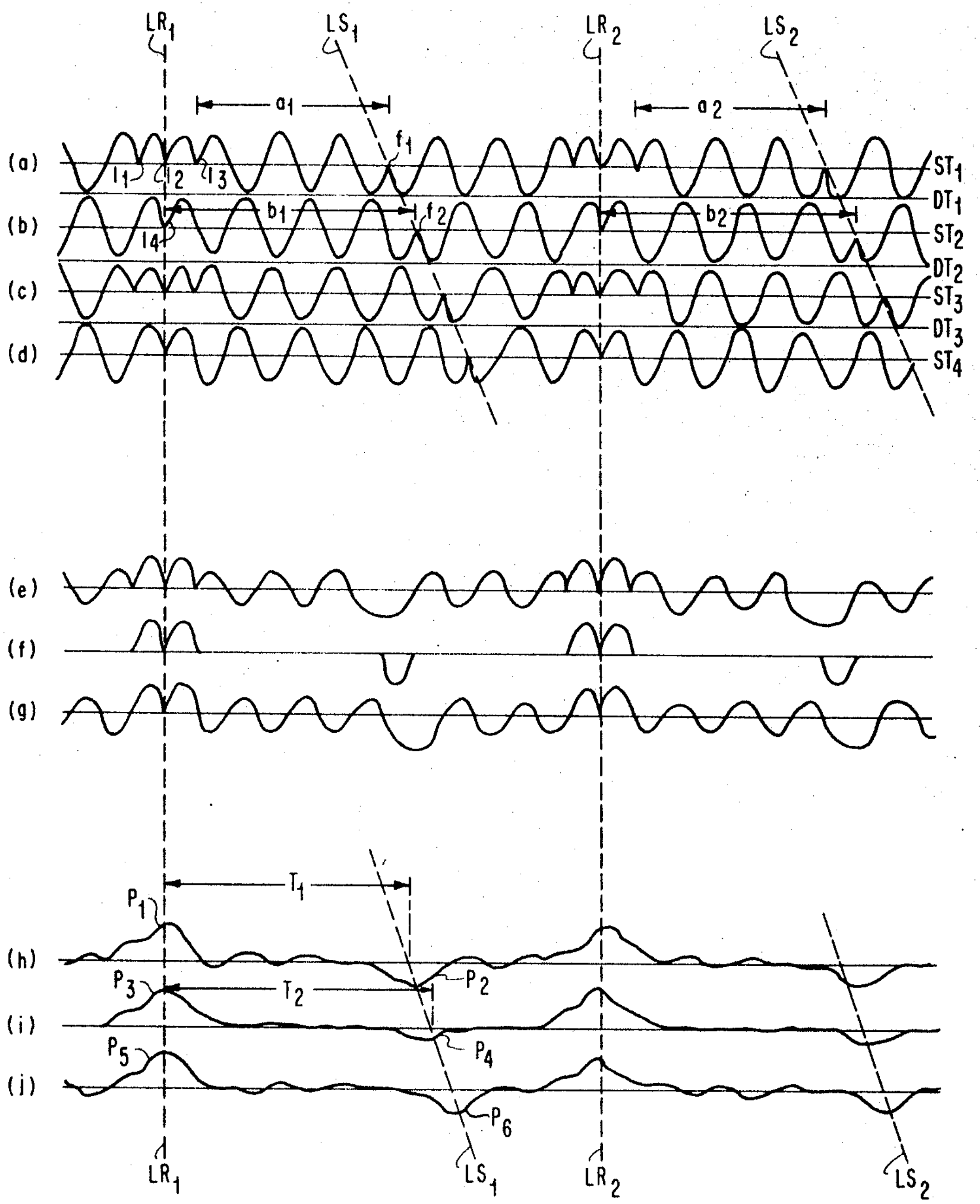
FIGURE 4 illustrates waveforms useful in explaining the embodiment of the invention illustrated in FIGS. 1–3.

FIGURES 4(*a*) through (*d*) illustrate the waveforms that will be generated by the servo position information tracks in a magnetic pickup aligned with servo position information tracks ST1 through ST4, respectively. The waveform in FIGURE 4(*a*) includes a plurality of time periods *a*1, *a*2, etc. during which the servo track will generate a sinusoidal signal. As shown in FIGURE 4(*a*), these periods are defined by leading edge phase reversals termed radial lines and trailing edge phase reversals termed spiral lines of the sine wave. More specifically, prior to the time period *a*1, there are three phase reversals of the sine wave and are illustrated as $l_1$, $l_2$ and $l_3$. At the end or at the trailing edge of the time period *a*1, there is a single phase reversal *t*1 which is a phase reversal of the opposite sense or polarity as the phase reversals $l_1$, $l_2$, $l_3$. Thus, it will be seen that a coarse position time period can be defined by the time period from the radial line LR1 passing through $l_2$ to the trailing spiral line LS1 passing through *f*1. Similar phase reversals and sine wave portions are repeated throughout the servo track ST1.

Servo position information track ST2 is located on the opposite side of the processor-data information track DT1 as shown in FIGURES 3 and 4, and the same distance as track ST1 from track DT1. This servo position information track has likewise repeated pure sine wave sections *b*1, *b*2, etc. as shown in FIGURE 4(*b*); however, these sine wave sections are 180 degrees out of phase with the sine wave signal generated during periods *a*1, *a*2, etc. by servo position information track ST1. The leading edge of the sine wave section *b*1 is defined by a single phase reversal $l_4$ at the leading edge of the time period defined by this portion and is also part of the radial line LR1. The trailing edge of the sine wave portion *b*1 is defined by a phase reversal of the opposite sense and illustrated by *f*2 in FIGURE 4(*b*) and is also part of the spiral line LS1. As shown in FIGURE 4, the servo position information track ST2 has a plurality of these sine wave periods *b*1, *b*2 with the phase reversals defining similar time periods. The locus of the leading edges of these coarse position time periods defined by phase reversals $l_2$, $l_4$ and corresponding phase reversals in servo position information tracks ST3 and ST4, is shown by radial line LR1 and as shown in FIGURE 3, is physically located on the disk 10 in radial alignment such as shown in copending patent application Ser. No. 420,009, filed Dec. 21, 1964, in the name of Black et al. The trailing edge of the coarse position time periods shown by negative phase reversals *f*1, *f*2 and corresponding phase reversals in servo position information tracks ST3 and ST4 define a spiral line, is shown in a time domain as LS1 in FIGURE 4 and physically in FIGURE 3 in a spiral configuration similar to the spiral lines and time periods shown in the above patent application.

As set forth in the above identified patent application, by utilizing the coarse position time periods, with the trailing edges spirally disposed spatially on the disk, these time periods can be made to vary linearly as the radial distance of the track from the periphery of the disk as shown in FIGURE 4. Thus, by utilizing this configuration of position time periods on each servo position information track, coarse adjustment of the pickup head near to a processor-data information track can be made.

The pickup circuitry 20 includes a magnetic pickup head 21 which is positioned over the disk 10 to simultaneously receive the servo position information as well as the processor-data information from the servo position information and processor-data information tracks. If the pickup 21 is on one side of a processor-data information track, the resulting output signal from head 21 due to the servo tracks will, for example, appear as the waveform illustrated in FIGURE 4(*e*). If the pickup head is on the other side of the processor-data information track, the signal will appear as in FIGURE 4(*g*). If, however, the pickup head is aligned with the processor data information track, the output will appear as illustrated by FIGURE 4(*f*). The output of the pickup 21 is preferably applied to an A.C. amplifier 22, the output of which is applied to a servo position information signal bandpass amplifier 23 which has a bandpass characteristic to pass the servo position information signal frequencies but to eliminate the processor-data information track frequencies (not shown in FIGURE 4). The output from the bandpass 23 is applied to the coarse position detector 40 through a pulse shaping network 30. The pulse shaping network 30 includes a low pass filter 31 that will substantially smooth out the sine wave frequencies occurring, for example, in time periods *a*1 and *b*1 shown in FIGURES 4(*e*) and (*g*), and enhance the lower frequency harmonics due to the phase reversals of the coarse information. Thus, the output of filter 31 for the waveform shown in FIGURES 4(*e*), (*f*) and (*g*) will appear as the waveform shown in FIGURES 4(*h*), (*i*) and (*j*), respectively. It will be noted that the leading edge pulses P1, P3 and P5 are, for example, positive going and of a first polarity whereas the trailing edge pulses such as P2, P4 and P6 are of the opposite sense and negative going. The wave shaping network 30 as well as the coarse position detector 40 per se form no part of this invention and, in fact, are the same as the coarse position detector illustrated in the above identified copending applications Ser. Nos. 420,009 and 531,135.

Figure 2:
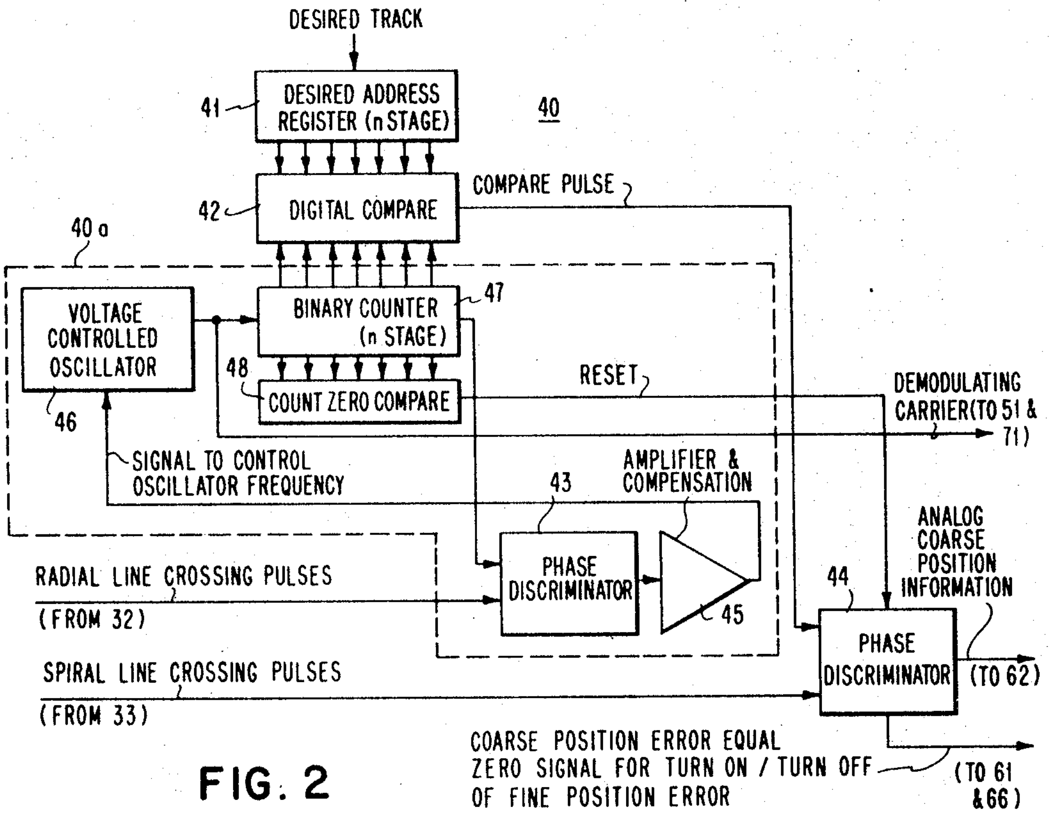
FIGURE 2 is a more detailed schematic in block form of the coarse position detector illustrated in FIGURE 1.

The waveforms out of the low pass filter 31 are applied to a radial line detector 32 as well as a spiral line detector 33. Thus, the positive going leading edge pulses P1, P3 and P5 will appear at the output of the radial line detector 32 (such as a clipper) whereas the trailing edge pulses P2, P4 and P6 will appear at the output of the spiral line detector 33 (such as a limiter). Both of these outputs are applied to the coarse position detector 40 shown in detail in FIGURE 2, which is similar to the coarse position detector illustrated in the above two copending applications. More specifically, the radial line detector 32 applies the positive going time-base pulses to a conventional digital phase discriminator 43 and the spiral line or position pulses (negative going) are applied to a phase discriminator 44. The discriminator 43 also receives a pulse from counter 47 when it has completed a counting cycle. The discriminator 43 has a continually varying signal having an amplitude and polarity which indicates the phase difference, if any, between counter 47 and the passing of pickup 21 over the radial lines. Such a discriminator is commonly utilized as horizontal AFC circuit in television sets, however, it may take the form shown in U.S. Patent 3,005,165 issued Oct. 17, 1961, entitled "Pulse Position Error Detector." Discriminator 44 is illustrated in detail in FIGURE 3 of the above identified copending application Ser. No. 420,009. The output of the phase discriminator 43 is applied to an amplifier and servo compensator 45 which is applied to a voltage controlled oscillator 46 whose frequency is controlled by the frequency of occurrence of the radial line or positive going leading edge pulses (P1, P3, etc.). As set forth in the above pending application, and as illustrated here, the elements included within the dotted line illustrated as 40*a* constitute a phase lock reference count generator. The output of the voltage controlled oscillator 46 is applied to a binary counter 47 whose output is also connected to phase discriminator 43 so as to force the voltage controlled oscillator 46 to run at a frequency such that the time required for the binary counter 47 to count through the total number of data tracks is exactly the same as the time between LR1 and LR2. The counter 47 is reset to zero after this counting through this time period. Hence, the time between radial lines (LR1, LR2, etc.) is divided into sub-portions of time, each corresponding to a unique data-track radical position. The variation in time due to disk 10 rotational variation is thusly eliminated.

The digital quantity output of the binary counter 47 is applied to a digital compare circuit 42 having an input from a desired address register 41. More specifically, the register 41 receives the information as to the desired track from the interrogational processor. The digital compare circuit will give a compare pulse when the desired address register 41 and the binary counter 47 have the same numerical quantity stored in each. A count zero pulse from 48 applies a reset pulse to discriminator 44 when binary counter 47 is at zero. This resets the discriminator 44 to zero at the beginning of each time period beginning when the pickup 21 passes over a radial line LR1, LR2, etc. That is, this compare pulse is applied to the phase discriminator 44 and the time of occurrence as measured from binary count zero (reset) corresponds to a length of time to be compared to the length of time between the radial line pulse and the spiral line pulse. If the time period between the leading and trailing pulses generated from the tracks over which the head is positioned, is that the desired track, there will be no information emanating from the phase discriminator 44 and into the resolving unit 60. Hence, the length of time between the count zero (reset) pulse from 48 and the compare pulse at the output of 47 is the addressing reference signal of this positioning servo, and the length of time between the radial line pulse and the spiral line pulse is the actual position or servo output indcator. It can therefore be seen that the phase lock reference count generator guarantees that count zero (reset) and the radial line pulse occur simultaneously. The output of the phase discriminator 44 is an analog voltage, the magnitude of which is a function of the time between the pulses from 42 and 33. As stated above, discriminator 44 is then reset to zero by a count zero pulse from 48. The polarity of the output of 44 will be dependent on which pulse (from 42 or 33) occurs first. This will indicate on which side of the desired track the pickup 21 is positioned.

The output of the phase discriminator 44 is also applied to gate 61 of the resolving network 60. So long as there is a significant output from the phase discriminator 44, the gate 61 will be closed and there will be no fine position signal applied into the analog summing junction 62 so that only coarse position error will pass through summing junction 62. When, however, there is minimal coarse position error from the phase discriminator 44, the linear gate 61 will be opened and fine position error information will be permitted to pass through the linear gate 61, added 62 to an analog summing junction 63. While, however, the coarse position error information is present at the summing junction 62, it will be applied through analog summing junction 63 to a linear actuator 64. The actuator 64 will drive a probe 65 on which the pickup head 21 is mounted so as to effect a coarse positioning action to pickup head 21, driving it near the desired data track.

Thus, it is seen that the pulses such as illustrated in FIGURE 4(*h*) through (*j*) are passed through a low pass filter 31 so that the coarse positioning will be obtained or can be obtained identically to the above patent application. Circuitry detecting the peak of the pulses is used to better resolve their times of occurrence.

The output of the servo signal bandpass amplifier 23 (for example, the waveforms illustrated in FIGURES 4(*e*), (*f*) and (*g*)) will also be applied to the fine positioning channel 50.

It will be noted that at the radial line there are three phase reversals on the servo position information track ST1 as well as on track ST3 whereas on servo position information tracks ST2 and ST4, there is only one phase reversal on the radial line. Thus, the phase of the sinusoidal, constant-frequency portion of the servo position information tracks will remain in correct phase opposition with adjacent tracks once the region of coarse information is passed. Hence, the difference in phase reversals on the leading edge of the time periods is two phase reversals or 360 degrees, the sine wave portions of the *a*1 and *b*1 will remain in phase opposition or 180 degrees out of phase.

By way of example, let it be assumed that the instructions to the desired address register 41 are that information is desired from processor-data information track DT1. The address register 41 will have a count corresponding to a time period midway between the coarse time periods of the two servo tracks adjacent the desired data information track. If DT1 is the desired data information track, the count in register 41 would correspond to $$\frac{T1+T2}{2}$$

On the dual coercivity disk, however, a servo track could be recorded directly above or below a processor data information track. If this is done, the address register will contain a count corresponding to the time period (T1, T2, etc.) of the servo track above or below the desired data information track.

The pickup 21 will apply a signal through servo bandpass 23, low pass filter 31 into the radial and spiral line detectors 32 and 33, respectively, and thence into the coarse position detector 40. There will be an output corresponding to the coarse position error from the phase discriminator 44 so as to move the pickup head inwardly or outwardly of the disk 10 by applying this signal through summing junction 62, summing juction 63 and the actuator 64. When the signal waveform shown in FIGURE 4(*b*) is received, it is detected that the radial line pulse P3 and the spiral line pulse P4 are the desired time position period apart; that is, time period T2 as shown in FIGURE 4(*i*). This is determined by the averaging of the radial and spiral line pulses of servo tracks ST1 and ST2 as shown in FIGURE 4(*f*). When this is reached, the coarse position error signal goes to zero and by adjustment of the servo, the pickup head has been positioned near the processor-data information track DT1, between ST1 and ST2. When the analog coarse position error signal is essentially zero, this results in the linear gate 61 being opened to thereby permit a fine positioning error signal to pass. This coarse positioning channel is by way of example and is identical to that shown in the above copending application Ser. No. 531,-135. In the summing junction 63, the velocity or damping signal is introduced from a unique radial velocity detector 70 so as to maintain stability during the positioning by the actuator 64 of the head 21. This velocity detector is described in detail below and applies a damping factor to the servo during both fine and coarse positioning.

As set forth in the above copending application Ser. No. 531,135, conventionally a tachometer is utilized to obtain a velocity signal to stabilize servos.

As can be seen, the amplitude of the read back signal will be equal to zero when the pickup 21 is positioned an equal distance from two servo tracks and over the desired information track. At all other positions between the bounding servo tracks the servo position error is not zero and the amplitude of the read back signal is not zero. It can be seen, therefore, that the read back signal is a suppressed carrier, amplitude-modulated signal in which the suppressed carrier has a frequency equal to the servo track frequency $W_s$ and the information modulating that carrier is the radial position of the pickup between the two bounding servo tracks. If a sinusoidal signal of constant amplitude and of the frequency corresponding to $W_s$ with a phase differing by 90 degrees with respect to the servo track read back signal were linearly added to the read back signal, the final position information would be contained in the phase of the resultant signal. See page 119 of "Information, Transmission, Modulation, and Noise" by M. Schwartz, McGraw-Hill, Inc., 1959. The resulting output signal can be compared to the constant amplitude shifted signal for phase after each signal has been limited to remove useless amplitude variations. In the present invention, the difference in phase of these two signals is converted to an analog signal which is utilized to position the actuator 64.

The above resulting signal is also utilized for obtaining damping velocity information and this is done by the change in frequency of this resultant signal. Hence, the phase of the resultant signal is a measure of the pickup heads position whereas the shift of frequency of the resultant signal is a measure of the velocity.

Figure 5:
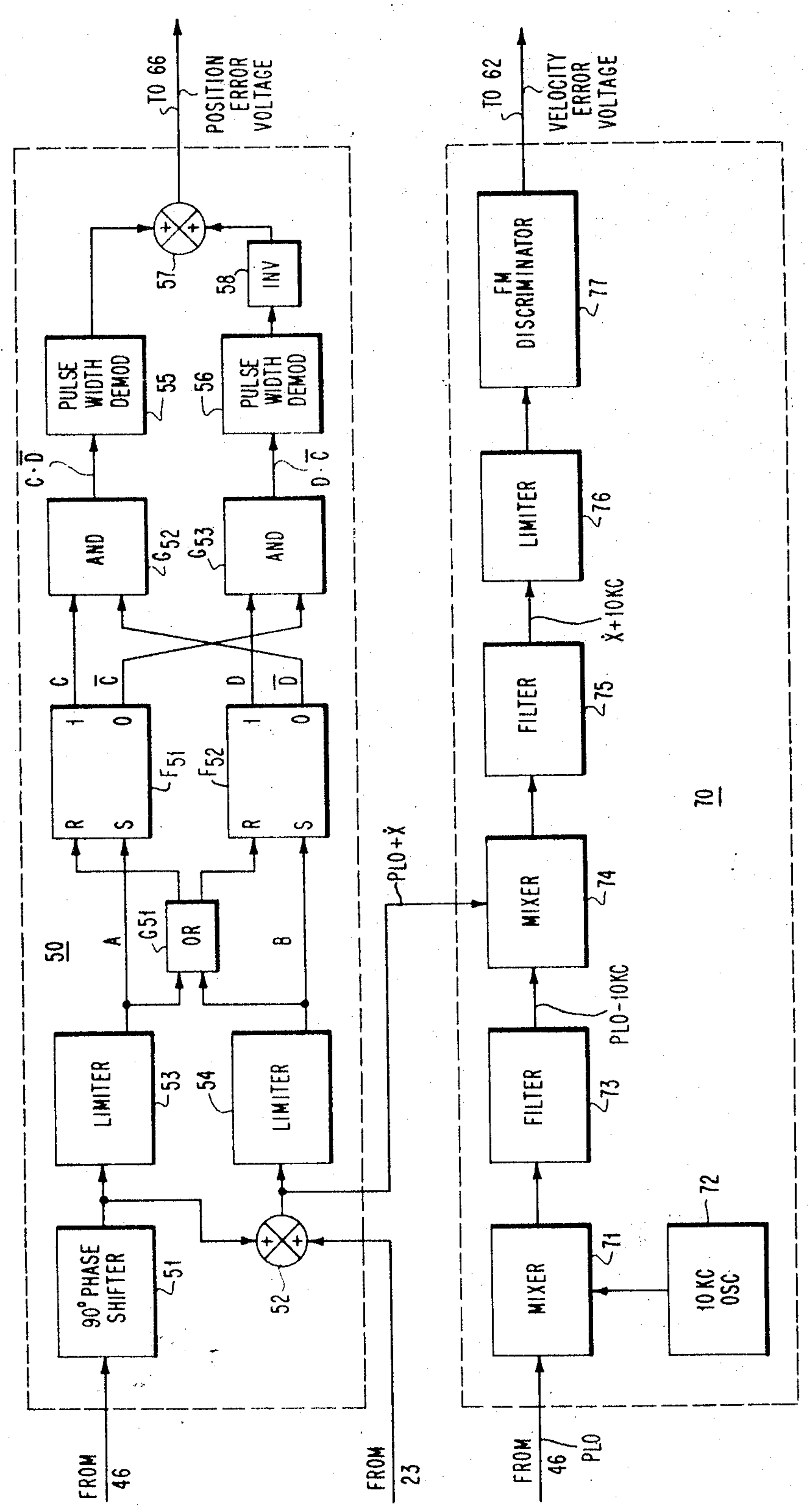
FIGURE 5 illustrates a more detailed schematic diagram in block form of the fine position detector and the radial velocity detector illustrated in FIG. 1.

To accomplish the above fine position detection, the oscillator 46 is connected to the fine position detector 50 and more specifically is connected to a phase shifter 51 which shifts this signal 90 degrees to thereby provide the first ingredient for the desired signal mentioned above. As shown in FIGURES 1 and 5, the amplifier 23 is also connected to the detector 50 and more specifically to the summer 52 which adds the phase shifted signal from shifter 51 as well as the output of the pickup which provides a double side band suppressed carrier signal. The phase shifted signal from the phase shifter 51 is also connected to the input of a limiter 53 whereas the resultant signal from the summer 52 is connected to a limiter 54 as shown in FIGURE 5. The limiters 53 and 54 convert the sine wave input signals to square wave output signal A from limiter 53 and B from limiter 54 as shown in FIGURE 7 by way of example.

The difference in phase between the signals A and B is a measure of the position of the pickup head with respect to a desired information track. Thus, the remainder of the components in the detector 50 constitute a phase discriminator and are shown by way of example of a discriminator that could be used to determine the phase difference between the signals, A and B. It will be understood that other circuitry or detectors or discriminators could be utilized to determine the phase difference between the signals A and B.

Figure 6:
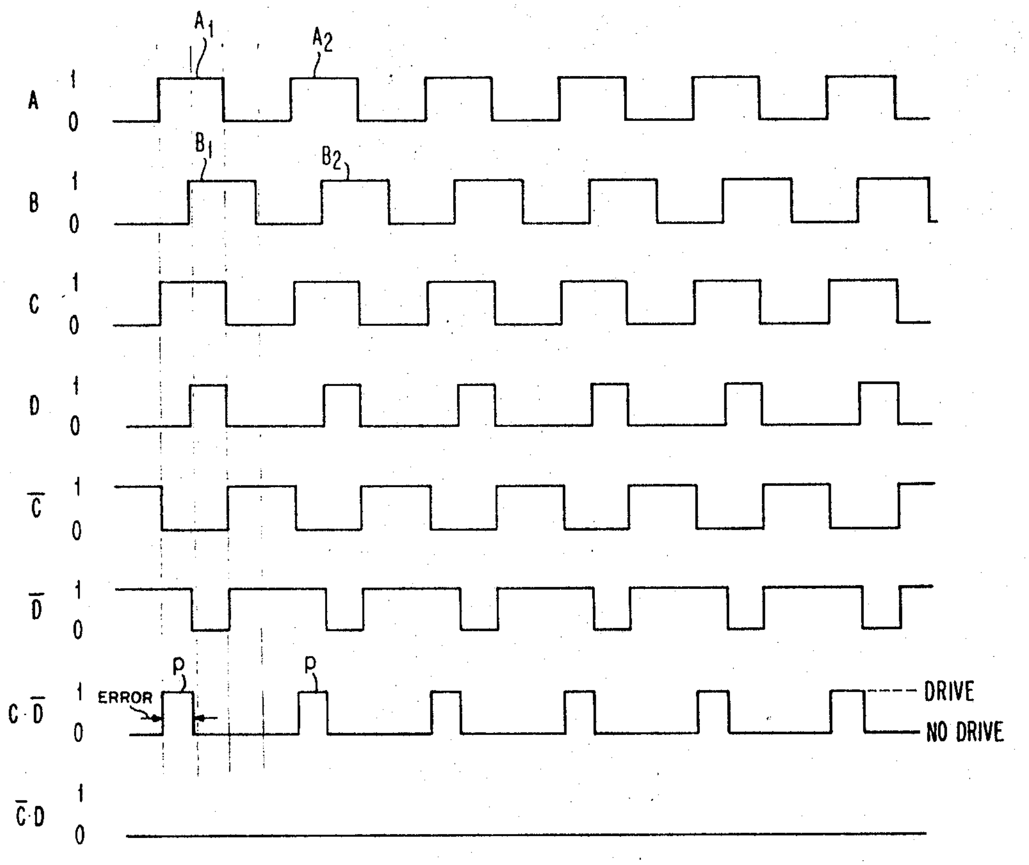
FIGURE 6 illustrates a timing diagram useful in explaining the operation of the positon detector and velocity detector illustrated in FIG. 5.

The outputs of limiters 53 and 54 are both connected to an OR gate G51. Limiter 53 is also connected to the set input of RS flip flop F51 whereas the output of limiter 54 is connected to the set input of RS flip flop F52. The flip flop F51 will be set to 1 upon the occurrence of the leading edge of any of the square wave pulses of signal A illustrated as A1, A2, etc. in FIGURE 6. Flip flop F52 will be set to 1 by the leading edge of any of the square wave pulses of signal B (B1, B2, etc.) as shown in FIGURE 6. Both flip flops F51 and F52 will be reset to zero by the trailing edge of either the pulses A or the pulses B (passing through gate G51), whichever occurs first. The two outputs of the flip flops F51 and F52 are illustrated in the set condition in the drawings. The upper output of flip flop F51 applies a signal C to AND gate G52 and the lower output of RS flip flop F52 applies a signal $\overline{D}$ to AND gate G52. The upper output of flip flop F52 provides an input D to AND gate G53 and the lower output of flip flop F51 provides an input $\overline{C}$ to AND gate G53. Thus, the logical equation for the output of the AND gate G52 is $C \cdot \overline{D}$. The output of AND gate G53 is $D \cdot \overline{C}$.

These signals $C \cdot \overline{D}$ and $D \cdot \overline{C}$ as shown in the last bottom waveforms in FIGURE 6 are applied to pulse width or pulse duration demodulators. More specifically, the output of gate G52 is connected to pulse width demodulator 55 and the output of gate G53 is connected to a pulse width demodulator 56. In the drawing, the $C \cdot \overline{D}$ signal is shown as providing an error output signal by way of the square wave pulses *p* shown therein whereas the $\overline{C} \cdot D$ remains zero and provides no signal. If, however, the position of the head 21 were on the opposite side of the desired information track, the $\overline{C} \cdot D$ signal would have square wave pulses whereas the $C \cdot \overline{D}$ would remain zero and provide no signal into the demodulator 55. Thus, depending upon which side of the information track the pickup head is will determine upon which of the gates G51 and K52 has an output. The demodulators 55 and 56 are well-known and provide an analog output that has an amplitude that varies as a function of time width or duration of the pulses (if any) applied to its input. These demodulators could be synchronized with the leading edge of the pulses A (A1, A2, etc.). These demodulators could also be asynchronous.

The output of demodulator 56 is applied to an inverter 58 that inverts this signal. The inverted signal is then applied to a summing junction 57. The output of demodulator 55 is also applied to junction 57. Thus, if the head is displaced from the desired data track, the polarity of the signal from junction 57 will be determined by the side of the data track the head is displaced. The amplitude of the signal varies as the distance the head is displaced from the track. This signal drives the actuator 64 during and after the head has been positioned by the coarse positioning channel of the servo. Various methods or circuits could be employed to convert this signal but FIGURE 5 illustrates one method of doing so.

Thus, this signal indicating the position of the pickup will be applied to the gate 61. When the coarse positioning detector indicates no error (from discriminator 44) from the coarse positioning servo, the gate 61 (and gate 66) will be opened and the output of the ramp generator 55 will be applied through the analog summing junction 62 to the analog summing junction 63. In the analog summing junction 63, this fine position information will be subtracted from the information obtained from the velocity detector 70 through gate 66.

The error velocity detector 70 is illustrated in more detail in FIGURE 5. The phase locked oscillator 46 applies its signal to a mixer 71 which is mixed with a 10 kc. signal from an oscillator 72. The resultant signal from mixer 71 is passed to a filter 73 that passes only the lower or difference side bands from mixer 71, i.e., the frequency of the signal from oscillator 46 minus 10 kc. The output of filter 73 is then applied to a second mixer 74 which mixes the signal from filter 73 with the signal from the adder 52. The output of mixer 74 is then applied to a filter 75 which passes only the lower or difference side bands, i.e., with the frequency from added 52 minus the frequency from filter 73. Thus, the output of 75 is a signal having a frequency which varies about a 10 kc. center frequency. This signal is then applied to a limiter 76 and then to a conventional FM discriminator 77 with a 10 kc. center frequency. The output thus is a measure of the radial velocity error and is subtracted in the summing junction 63 when gate 66 is open from the fine position information obtained from the position detector 50 to thereby provide sufficient damping in the servo loop to prevent oscillation of the actuator 52 in servoing the pickup head 21 to the desired tracks.

OPERATION

Thus, it is seen that the pickup head 21 can be initially servoed by the coarse position servo channel to the desired data or information track. For example, if it is desired to position the head 21 over the data track DT1, the coarse position detector senses the phase reversals until the time length between the phase reversals is equal to that on servo tracks ST1 and ST2 divided by two $$\frac{T1+T2}{2}$$

At that time, the head 21 is positioned between these two servo tracks whereupon the gate 61 is opened so as to provide a fine position error signal through the junction 62. If the pickup head is positioned by chance directly over the data track DT1 and there is no motion, the sine wave portions *a*1 and *b*1 of the data servo tracks ST1 and ST2, will cancel out and there will be no output from the fine position detector 50 or the radial velocity detector 70 so that the actuator 64 will remain idle and the pickup head 21 will remain in this position. It being understood that although by way of example the phase reversal time periods as shown are a relatively large time portion of the total signal, when actually the phase reversal periods will be only a very small percentage of the total signal particularly with respect to the two sine wave portions *a*1 and *b*1.

If the pickup head 21 is not positioned in a position directly over the desired data track DT1, the sine wave portions *a*1 and *b*1 will produce a double side band suppressed carrier amplitude-modulated signal which will be passed from the output of the servo band pass amplifier 23 through the summing junction 52. The voltage controlled oscillator 46 will produce a signal having the same frequency as the suppressed carrier of this signal and in phase with such carrier. The signal coming from the oscillator 46 is passed through a 90 degrees phase shifter 51 in the fine position detector 50 and then is linearly added with the double side band suppressed carrier signal from the amplifier 23 in the summer 52. The added or resultant signal coming from the summer 52 and the phase shifted signal coming from the phase shifter 51 are then compared to determine the phase difference therebetween so as to provide a position error signal. More specifically, the phase shifted signal from shifter 51 is applied to a limiter 53 as is the resultant added signal applied to a limiter 54. This produces square wave signals A and B, as shown in FIG. 6. The phase difference between these signals A and B is then measured by a phase discriminator including OR gate G51, RS flip flops F51 and F52, AND gates G52 and G53, demodulators 55 and 566. This produces the output signal for example as shown by $C\cdot\overline{D}$ in FIGURE 6. As discussed in detail above, the signal is by way of an example of the error in the position of the head radially of the center. Depending upon the side which the pickup is from the desired data track, there will be an output from either demodulator 55 or demodulator 56. As shown in FIGURE 6, there is an output from AND gate G52 ($C\cdot\overline{D}$) with the square wave pulses having a time width that is a measure of the distance the pickup head is located from the data track. At this time, there is no output from the AND gate G53.

The position error voltage from the fine detector 50 is not applied directly to the actuator but rather is combined with the velocity error voltage from the velocity detector 70 so as to provide a damping factor in the servo loop to improve stability and to prevent oscillations or regeneration. More specifically, the voltage controlled oscillator 46 is mixed with the 10 kc. signal from an oscillator 72, in the mixer 71. The frequency of the signal from oscillator 46 can be for example in the order of magnitude of 100 kc. In FIGURE 5, the signals utilized in the detector are illustrated symbolically with PLO being the frequency of the signal from oscillator 46 which has the carrier frequency plus any frequency variations due to disc rotation and $\dot{X}$ being the frequency which varies as the radial velocity of head 21.

The sum and difference side bands from mixer 71 are fed through filter 73 that passes only the difference frequencies of the signal ($PLO-10$ kc.) which is then fed to a second mixer 74 with the phase-shifted fine position signal from summer 52 ($PLO+X$). In mixer 74, these signals are mixed to produce sum side bands $$PLO+\dot{X}+(PLO-10 \text{ kc.})$$

and difference side bands $PLO+\dot{X}-(PLO-10 \text{ kc.})$. This signal is passed through a filter 75 so as to pass only the difference side bands ($\dot{X}+10$ kc.). Thus, the output of filter 75 is a 10 kc. signal that is frequency modulated by the velocity of head 21. This signal is then applied to a limiter 76 which produces a square wave signal with a frequency that varies with respect to a 10 kc. center frequency. This signal is then applied to an FM discriminator 77 having a 10 kc. center frequency.

The analog output of the discriminator 77 has an amplitude that is a measure of the relative radial velocity of the head 21 and disc 10 and the polarity of the output is an indication of the direction of the velocity. When there is no output from 44, gate 66 is opened and this signal is then subtracted from the output of the fine position detector 50 in the analog summing junction 63 so as to provide a stable signal for driving the actuator 64. When the actuator 64 servos the pickup head 21 to the desired data track such as DT1, there will be no output from the pickup head 21 through the amplifier 23 and hence there will be no output from the detector 50 or the velocity detector 70.

While the invention has been particularly shown and described with reference to embodiment thereof, it should be understood by those skilled in the art that the foregoing and other changes in form and details may be made therein without departing from the spirit and scope of the invention.

I claim:

1. A closed loop servosystem for fine positioning a signal sensing transducer that is movable radially relative to the surface of a rotary record member which has a plurality of concentric data tracks recorded thereon, comprising:

servo-position information tracks recorded alternately with said data tracks on said record member, each of the pair of servo tracks associated with a data track being substantially equidistant from said data track, each servo track including a sinusoidal signal, and a continuous sine wave signal portion that is 180° out of phase relative to adjacent servo track sine wave portions;

means for sensing said servo track signals and producing a coarse position error signal, and for applying a coarse position correction in response to said error signal to position said transducer relative to a data track;

means for sensing the velocity of said transducer relative to the record member to develop a fine position error signal, and for providing a fine position correction to said transducer in response to such fine error signal.

2. A closed loop servosystem as in claim 1, wherein said transducer senses the servo position information and data simultaneously.

3. A closed loop servosystem as in claim 1, wherein said transducer comprises a magnetic head, and said record member is a magnetic disk.

4. A closed loop servosystem as in claim 1, wherein said record member has a high coercivity layer for recording servo signals, and a low coercivity layer for recording data signals.

5. A closed loop servosystem as in claim 1, including means for generating a double sideband suppressed carrier amplitude-modulated signal and further means for generating a second signal having the same frequency but 90° out of phase with said amplitude-modulated signal, and means for summing said signals, whereby said summed signal provides damping of said servosystem.

6. In a closed loop servosystem for fine positioning a signal sensing transducer that is movable radially relative to the surface of a rotary record member, which has a plurality of concentric data tracks recorded thereon, comprising the steps of:

recording servo position information tracks alternately with said data tracks on said record member, each of the pair of servo tracks associated with a data track being substantially equidistant from said data track, each servo track including a sinusoidal signal, and a continuous sine wave signal portion that is 180° out of phase relative to adjacent servo track sine wave portions;

sensing said servo track signals and producing a coarse position error, and applying a coarse position correction in response to said error signal to position said transducer relative to a data track;

sensing the velocity of said transducer relative to the record member to develop a fine position error signal, and providing a fine position correction to said transducer in response to such fine error signal.

References Cited

UNITED STATES PATENTS

| | | |
|---|---|---|
| 2,907,939 | 10/1959 | Sant Angelo. |
| 3,079,522 | 2/1963 | McGarrell. |
| 3,105,189 | 9/1963 | Forster. |
| 3,292,168 | 12/1966 | Gray. |

ORIS L. RADER, Primary Examiner
T. E. LYNCH, Assistant Examiner

U.S. Cl. X.R.

318—28, 30, 448